United States Patent
Miura et al.

(10) Patent No.: US 10,625,476 B2
(45) Date of Patent: Apr. 21, 2020

(54) APPARATUS FOR MANUFACTURING FIBER REINFORCED RESIN MATERIAL

(71) Applicant: TOYOTA JIDOSHA KABUSHIKI KAISHA, Toyota-shi, Aichi-ken (JP)

(72) Inventors: Masaya Miura, Toyota (JP); Tetsuya Oda, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 92 days.

(21) Appl. No.: 15/974,810

(22) Filed: May 9, 2018

(65) Prior Publication Data
US 2018/0326675 A1   Nov. 15, 2018

(30) Foreign Application Priority Data
May 12, 2017   (JP) .................. 2017-095994

(51) Int. Cl.
*B29C 70/50* (2006.01)
*B29C 70/54* (2006.01)
*B29C 70/08* (2006.01)
*D04H 1/736* (2012.01)
*D04H 1/4226* (2012.01)
(Continued)

(52) U.S. Cl.
CPC ......... *B29C 70/081* (2013.01); *B29B 15/105* (2013.01); *B29C 49/00* (2013.01); *B29C 70/14* (2013.01); *B29C 70/50* (2013.01); *B29C 70/508* (2013.01); *B29C 70/54* (2013.01); *B29C 70/545* (2013.01); *D04H 1/4226* (2013.01); *D04H 1/4374* (2013.01); *D04H 1/736* (2013.01); *D04H 1/74* (2013.01)

(58) Field of Classification Search
CPC ..... B29C 70/081; B29C 70/508; B29C 70/14; B29C 70/50; B29C 70/54; B29B 15/105; D04H 1/4226; D04H 1/736; B65H 35/02; B65H 35/04
USPC .................. 83/331–349, 404–404.4
See application file for complete search history.

(56) References Cited

U.S. PATENT DOCUMENTS

| 1,615,198 A * | 1/1927 | Blendow ................ A21C 11/10 83/303 |
| 2,538,972 A * | 1/1951 | Magnani ................ B23D 45/20 83/24 |

(Continued)

FOREIGN PATENT DOCUMENTS

| JP | H07-016836 A | 1/1995 |
| JP | 2000-017557 A | 1/2000 |

(Continued)

*Primary Examiner* — Evan H MacFarlane
*Assistant Examiner* — Nhat Chieu Q Do
(74) *Attorney, Agent, or Firm* — Oliff PLC (57) ABSTRACT

An apparatus for manufacturing a fiber reinforced resin material, by cutting long fiber bundles into a plurality of pieces having a predetermined length, and impregnating the cut fiber bundles with resin, includes a plurality of cutters each having a predetermined length and configured to cut the long fiber bundles, and a conveyance unit provided below the cutters and configured to continuously convey the fiber bundles cut with the cutters. The cutters are arranged along a conveying direction of the conveyance unit, such that respective longitudinal directions of the cutters form different angles with the conveying direction of the conveyance unit, when viewed from above the cutters.

4 Claims, 4 Drawing Sheets

(51) Int. Cl.
 *B29C 70/14* (2006.01)
 *B29B 15/10* (2006.01)
 *B29C 49/00* (2006.01)
 *D04H 1/4374* (2012.01)
 *D04H 1/74* (2006.01)

(56) References Cited

U.S. PATENT DOCUMENTS

| | | | | |
|---|---|---|---|---|
| 3,080,895 A * | 3/1963 | Mayo | ................ | B27B 5/246 |
| | | | | 83/404.1 |
| 3,229,732 A * | 1/1966 | Mayo | ................ | B27B 5/246 |
| | | | | 83/404.1 |
| 3,380,494 A * | 4/1968 | Mayo | ................ | B27B 5/246 |
| | | | | 83/404.1 |
| 3,875,837 A * | 4/1975 | Dussaud | ............ | A41B 13/04 |
| | | | | 83/46 |
| 3,887,719 A * | 6/1975 | Miller | ................ | A01J 25/114 |
| | | | | 426/517 |
| 4,277,998 A * | 7/1981 | Mayo | ................ | B23Q 1/50 |
| | | | | 83/404.1 |
| 4,296,164 A * | 10/1981 | Bemis | ................ | C04B 30/02 |
| | | | | 156/167 |
| 5,409,721 A * | 4/1995 | Rademaker | ............ | A21C 9/085 |
| | | | | 426/496 |
| 5,943,239 A * | 8/1999 | Shamblin | ............ | B23D 59/008 |
| | | | | 700/160 |
| 6,068,715 A | 5/2000 | Yokokita et al. | | |
| 6,524,090 B1 * | 2/2003 | Hayashi | ................ | A21C 3/02 |
| | | | | 425/140 |
| 2016/0288355 A1 * | 10/2016 | Sorensen | ............ | A22C 17/002 |

FOREIGN PATENT DOCUMENTS

WO 96/040477 A1 12/1996
WO 2016/208731 A1 12/2016

\* cited by examiner

APPARATUS FOR MANUFACTURING FIBER REINFORCED RESIN MATERIAL

INCORPORATION BY REFERENCE

The disclosure of Japanese Patent Application No. 2017-095994 filed on May 12, 2017 including the specification, drawings and abstract is incorporated herein by reference in its entirety.

BACKGROUND

1. Technical Field

The disclosure relates to an apparatus for manufacturing a fiber reinforced resin material, by cutting long fiber bundles into a plurality of pieces having a predetermined length, and impregnating the cut fiber bundles with resin.

2. Description of Related Art

An apparatus for manufacturing a fiber reinforced resin material is known which includes a belt conveyor that continuously conveys a carrier film, and one cutter roller that is disposed above the conveyor and cuts long fiber bundles into pieces having a given length. However, in the manufacturing apparatus thus constructed, the fiber bundles cut with the cutter roller and falling freely are likely to tilt or fall down in the conveying direction of the conveyor, namely, tend to be arranged in a direction parallel to the conveying direction, when the fiber bundles land on the carrier film conveyed. As a result, unevenness or a lack of uniformity may arise in the fiber orientation, and the strength of the material may vary in different directions, namely, the strength may be large in the conveying direction, but small in the other directions.

To deal with the above possibilities, various technologies have been proposed. For example, in an apparatus for manufacturing a fiber reinforced resin material described in Japanese Patent Application Publication No. 2000-17557 (JP 2000-17557 A, a rotating drum for tapping fiber bundles that are falling is provided between a cutter roller and a conveyance unit, and the fiber bundles, when tapped by the drum, are caused to fall randomly (or irregularly), so that the fiber bundles are isotropically oriented.

SUMMARY

According to the apparatus for manufacturing the fiber reinforced resin material as described above, a certain effect is obtained from uniform dispersion of the cut fiber bundles in various directions. However, since the fiber orientation cannot be controlled, unevenness in the orientation may not be curbed.

This disclosure provides an apparatus for manufacturing a fiber reinforced resin material, which can control fiber orientation, and reduce the possibility of uneven orientation.

One aspect of the disclosure is concerned with an apparatus for manufacturing a fiber reinforced resin material, by cutting long fiber bundles into a plurality of pieces having a predetermined length, and impregnating the cut fiber bundles with resin. The apparatus includes a plurality of cutters each having a predetermined length and configured to cut the long fiber bundles, and a conveyance unit provided below the cutters and configured to continuously convey the fiber bundles cut with the cutters. In the apparatus, the cutters are arranged along a conveying direction of the conveyance unit, such that respective longitudinal directions of the cutters form different angles with the conveying direction of the conveyance unit, when viewed from above the cutters.

In the apparatus for manufacturing the fiber reinforced resin material according to the above aspect of the disclosure, the cutters are arranged along the conveying direction of the conveyance unit, such that the respective longitudinal directions of the cutters form different angles with the conveying direction of the conveyance unit; therefore, the fiber bundles cut with the cutters have different orientation angles. Then, the fiber bundles having different orientation angles are uniformly dispersed in the intended directions, so that the fiber orientation can be controlled, and the possibility of uneven orientation can be reduced.

In the manufacturing apparatus as described above, the cutters may be four or more cutters, and second and subsequent ones of the cutters may be arranged along the conveying direction of the conveyance unit, such that the respective longitudinal direction of the second and subsequent ones of the cutters form angles of +45°, −45°, and +90° with the longitudinal direction of a first one of the cutters. With this arrangement, the orientation of the cut fiber bundles can be pseudo-isotropically controlled, and the resin material having sufficient strength isotropically can be obtained.

In the manufacturing apparatus as described above, a level of each of the cutters relative to a conveying surface of the conveyance unit may be substantially equal to the predetermined length of the fiber bundles cut with each of the cutters. With this arrangement, the fiber bundles can be cut at the time when the leading ends of the long fiber bundles reach the conveying surface of the conveying unit; therefore, the cut fiber bundles are prevented from bouncing, and the fiber bundles are likely to be oriented in the intended directions.

In the manufacturing apparatus as described above, each of the cutters may be a cutter roller on which a plurality of blades extending in the longitudinal direction of the cutter is arranged in a radial fashion. With this arrangement, the long fiber bundles can be cut with high efficiency.

A method for manufacturing a fiber reinforced resin material, using the manufacturing apparatus according to the disclosure, includes at least a cutting step of cutting long fiber bundles with a cutter, into a plurality of pieces having a predetermined length, so as to drop the fiber bundles toward the conveyance unit provided below the cutter, and an impregnating step of impregnating the cut fiber bundles with resin. The manufacturing method is characterized in that, in the cutting step, the long fiber bundles are cut with the cutter at the time when leading ends of the long fiber bundles reach the conveying surface of the conveyance unit. In this manner, the cut fiber bundles are prevented from bouncing, and the fiber bundles are likely to be oriented in the intended directions. Consequently, the fiber orientation can be controlled, and the possibility of uneven orientation can be reduced.

According to the disclosure, the fiber orientation can be controlled, and the possibility of uneven orientation can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An apparatus for manufacturing a fiber reinforced resin material according to one embodiment of the disclosure will be described, referring to the drawings. The apparatus 1 for manufacturing the fiber reinforced resin material according to this embodiment is used for manufacturing a sheet-like fiber reinforced resin material, by cutting long fiber bundles into pieces having a predetermined length, and sandwiching the cut pieces of the fiber bundles between upper and lower layers of carrier films coated with resin, so as to impregnate the fiber bundles with the resin.

The fiber bundle is a bundle of reinforcement fibers, and the reinforcement fibers are selected from carbon fibers, glass fibers, and others. As the resin, thermosetting resin or thermoplastic resin may be used. Specific examples of the thermosetting resin include, for example, unsaturated polyester resin, epoxy resin, vinylester resin, phenol resin, epoxy acrylate resin, urethane acrylate resin, phenoxy resin, alkyd resin, urethane resin, maleimide resin, and cyanate resin, and the thermosetting resin may consist of one type, or two or more types, selected from these types of resins.

In the meantime, specific examples of the thermoplastic resin include, for example, polyolefin resin, polyamide resin, polyester resin, polyphenylene sulfide resin, polyetherketone resin, polyethersulfone resin, and aromatic polyamide resin, and the thermoplastic resin may consist of one type, or two or more types, selected from these types of resins. Here, an example of manufacturing of SMC (Sheet Molding Compound) including a step of impregnating the cut fiber bundles with the thermosetting resin will be described.

Figure 1:
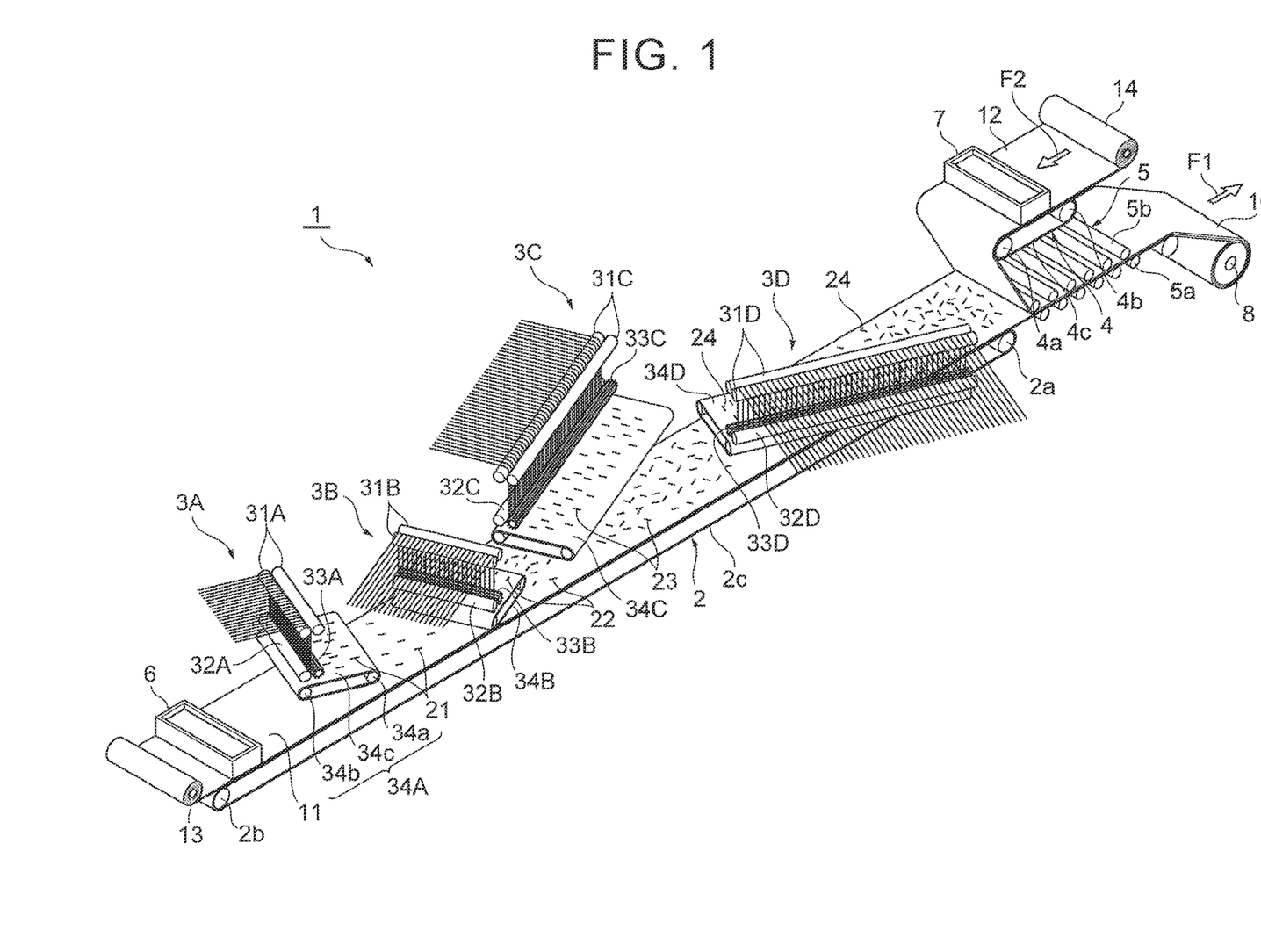
FIG. 1 is a perspective view showing the basic configuration of an apparatus for manufacturing a fiber reinforced resin material.

FIG. 1 shows the basic configuration of the apparatus for manufacturing the fiber reinforced resin material. The apparatus 1 for manufacturing the fiber reinforced resin material (which will be simply referred to as "manufacturing apparatus 1") includes a first conveyance unit 2 that conveys a sheet-like lower carrier film 11, four cutting units (first cutting unit 3A, second cutting unit 3B, third cutting unit 3C, and fourth cutting unit 3D) located above the first conveyance unit 2 and arranged along a conveying direction F1 (see arrow F1 in FIG. 1) of the first conveyance unit 2, a second conveyance unit 4 that is located above the first conveyance unit 2 and coveys a sheet-like upper carrier film 12, and an impregnating unit 5 located behind the first conveyance unit 2.

The first conveyance unit 2 is a belt conveyor having a drive rotary wheel 2a and a driven rotary wheel 2b around which an endless belt 2c is looped, for example. The first conveyance unit 2 continuously conveys the lower carrier film 11 rolled out from a film roll 13, in the conveying direction F1. A doctor box 6 for supplying paste containing resin, to the lower carrier film 11 conveyed by the first conveyance unit 2, is provided in the vicinity of the film roll 13, on the beginning side of the first conveyance unit 2.

The doctor box 6 is mounted so as to extend in the width direction of the first conveyance unit 2 (namely, the direction perpendicular to the conveying direction F1), over the lower carrier film 11 conveyed by the first conveyance unit 2. The doctor box 6 is used for applying paste by coating to the upper surface of the lower carrier film 11, via slits (not shown) formed in its bottom portion, to form a resin layer having a given thickness. The paste mentioned herein is a mixture of the above thermosetting resin, with a filler, shrinkage reducing agent, mold release agent, thickening agent, and so forth.

The first cutting unit 3A, second cutting unit 3B, third cutting unit 3C, and the fourth cutting unit 3D are arranged in this order from the beginning side to the ending side of the first conveyance unit 2 (in other words, from the upstream side to the downstream side). Each of the cutting units has a cutter roller, and the respective cutter rollers are arranged such that their axial directions form different angles with the conveying direction F1 of the first conveyance unit 2. The structure of each cutting unit will be described.

The first cutting unit 3A located closest to the beginning of the first conveyance unit 2 has a pair of pullout rollers 31A for pulling out long fiber bundles from a fiber supply unit (not shown), guide roller 32A and cutter roller 33A located below the pullout rollers 31A, and a conveyor 34A located below the guide roller 32A and the cutter roller 33A. The pair of pullout rollers 31A, guide roller 32A and cutter roller 33A are located above the first conveyance unit 2, such that the axes of these rollers extend in parallel with each other.

The pullout rollers 31A are located at the same level relative to the first conveyance unit 2, and serve to pull out the long fiber bundles while changing the direction of the fibers downward. The guide roller 32A and the cutter roller 33A are located at the same level relative to the first conveyance unit 2. The cutter roller 33A can be regarded as the "cutter" mentioned in "SUMMARY" above, and the direction of the axis L1 (see FIG. 2) of the cutter roller 33A can be regarded as the "longitudinal direction of the cutter" mentioned in "SUMMARY" above. The cutter roller 33A has a plurality of cutting blades 33a (see FIG. 4) that extends in its axial direction and is arranged in a radial fashion, and cooperates with the guide roller 32A to cut the long fiber bundle into pieces each having a predetermined length (e.g., 10 mm). The cutting blades 33a are arranged at regular intervals along the outer circumferential surface of the cutter roller 33A.

The conveyor 34A is disposed between the cutter roller 33A and the first conveyance unit 2. The conveyor 34A is a belt conveyor having a drive rotary wheel 34a and a driven rotary wheel 34b around which an endless belt 34c is looped. When the long fiber bundles are cut with the cutter roller 33A into fiber bundles 21, and the fiber bundles 21 fall freely, the conveyor 34A receive the fiber bundles 21, and continuously conveys them to the first conveyance unit 2. The axial directions of the drive rotary wheel 34a and driven rotary wheel 34b are in parallel with the axial direction of the cutter roller 33A.

Figure 2:
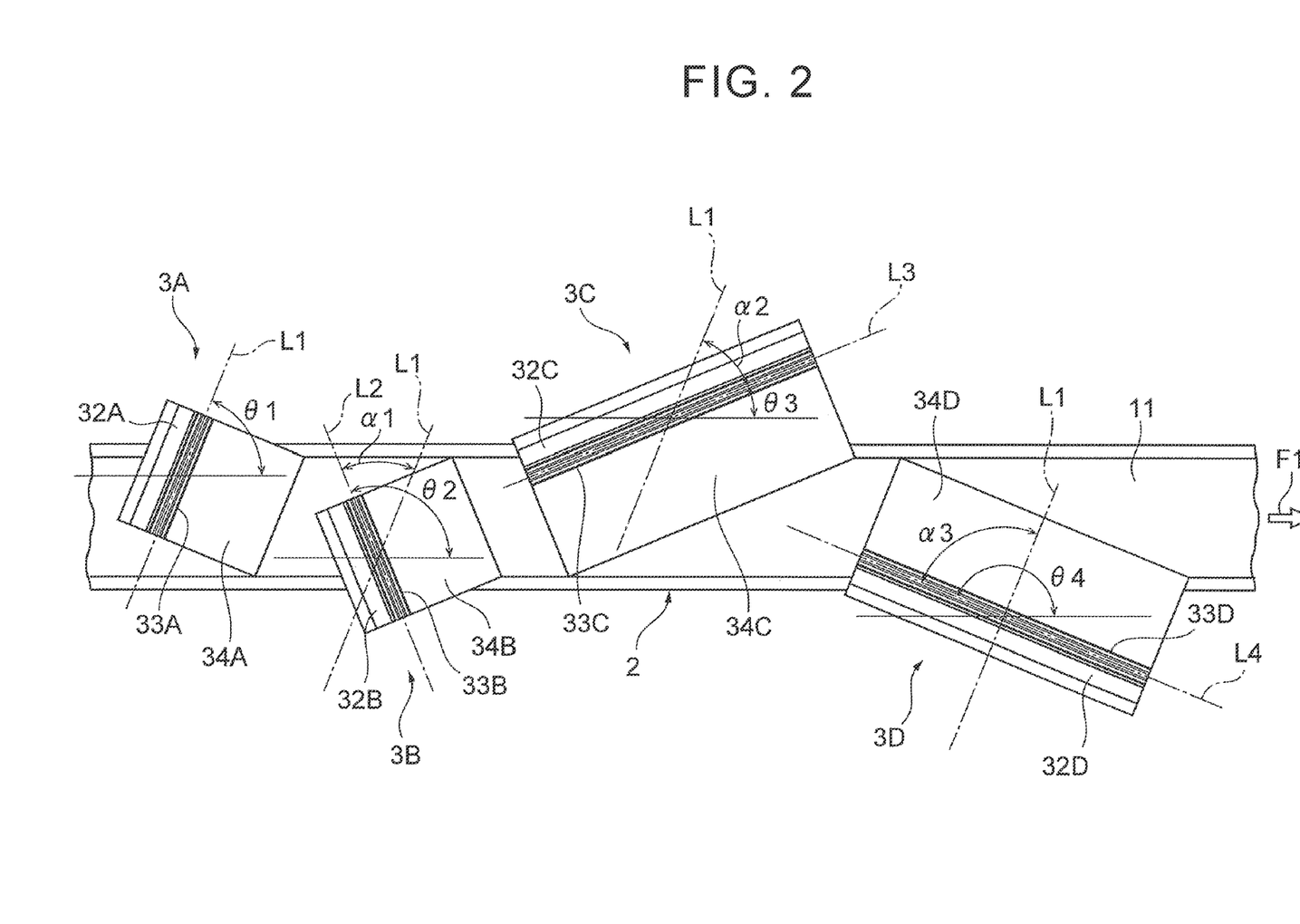
FIG. 2 is a schematic plan view showing the location and arrangement of respective cutting units.

The schematic plan view of FIG. 2 shows the location and arrangement of the respective cutting units. In FIG. 2, the pullout rollers and the fiber bundles are not illustrated, for the sake of easy understanding of the positional relationship among the cutter rollers of the respective cutting units, for example. As shown in FIG. 2, when viewed from above the cutter rollers 33A, 33B, 33C, 33D, the cutter roller 33A of the first cutting unit 3A is oriented such that the direction of its axis L1 forms an angle θ1 (in this embodiment, θ1=67.5°) with the conveying direction F1 of the first conveyance unit 2. As described above, the axial directions of the pair of pullout rollers 31A, guide roller 32A, drive rotary wheel 34a, and the driven rotary wheel 34b are in parallel with the direction of the axis L1 of the cutter roller 33A; therefore, the above-indicated axial directions also form the angle θ1 with the conveying direction F1 of the first conveyance unit 2. In this embodiment, the angles θ1, θ2, θ3 and θ4 formed between the axial directions of the respective cutter rollers and the conveying direction F1 represent angles as measured from the line indicating the conveying direction F1 in the counterclockwise direction.

Figure 3:
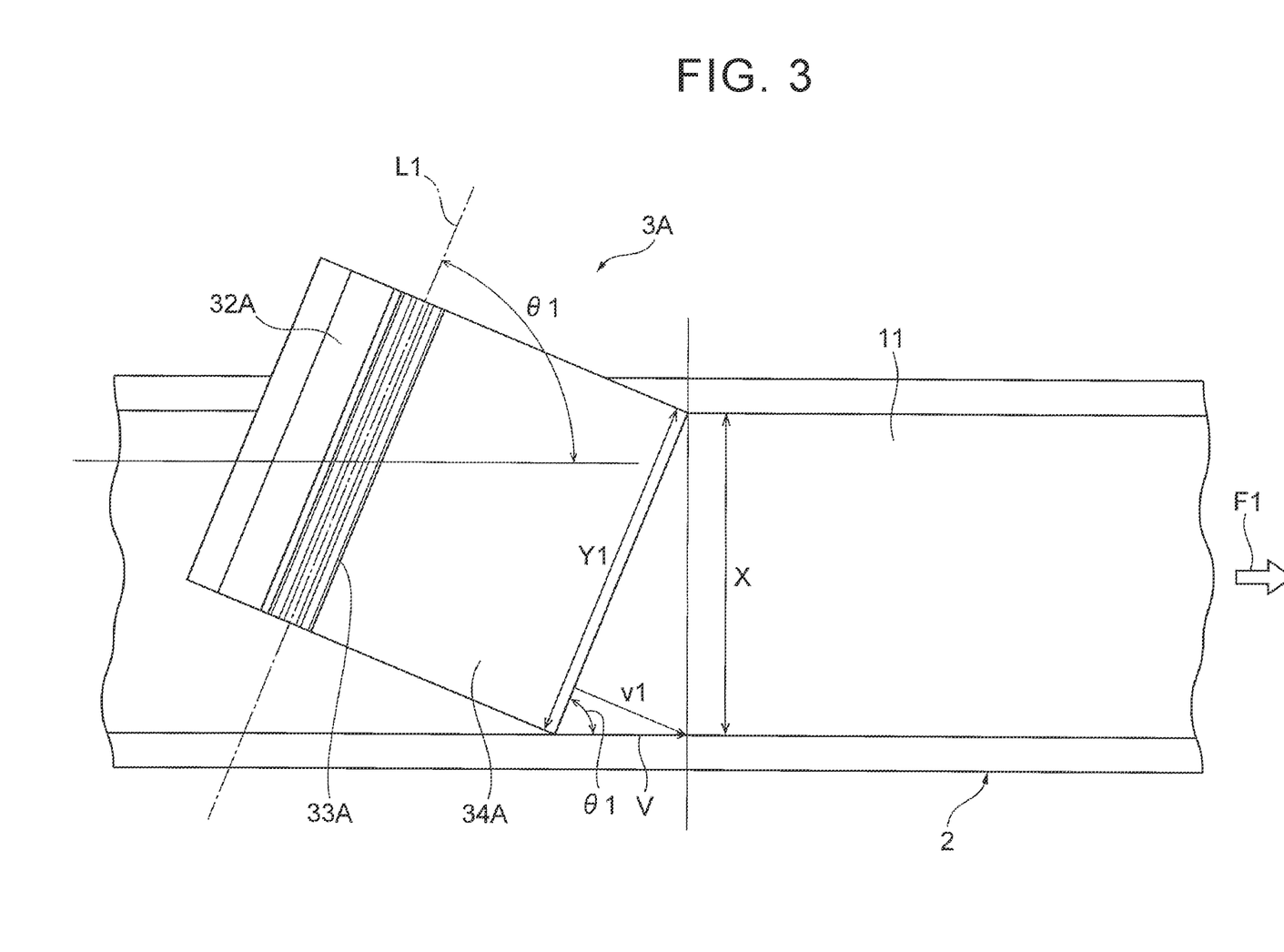
FIG. 3 is an enlarged schematic view of a first cutting unit shown in FIG. 2.

The enlarged schematic view of FIG. 3 shows the first cutting unit 3A shown in FIG. 2. As shown in FIG. 3, in the first cutting unit 3A, the direction of the axis L1 of the cutter roller 33A forms the angle θ1 with the conveying direction F1 of the first conveyance unit 2 (in other words, θ1 represents the angle formed between the direction of the axis L1 of the cutter roller 33A and the conveying direction F1 of the first conveyance unit 2). Thus, where X denotes the width of the lower carrier film 11, and Y1 denotes the width of the conveyor 34A of the first cutting unit 3A, the relationship of Y1=X/sin θ1 is satisfied. Also, where v1 denotes the conveying velocity of the conveyor 34A, and V denotes the conveying velocity of the first conveyance unit 2, the relationship of v1=V×sin θ1 is satisfied. In this manner, the width Y1 of the conveyor 34A and the conveying velocity of the conveyor 34A can be easily obtained.

Figure 4:
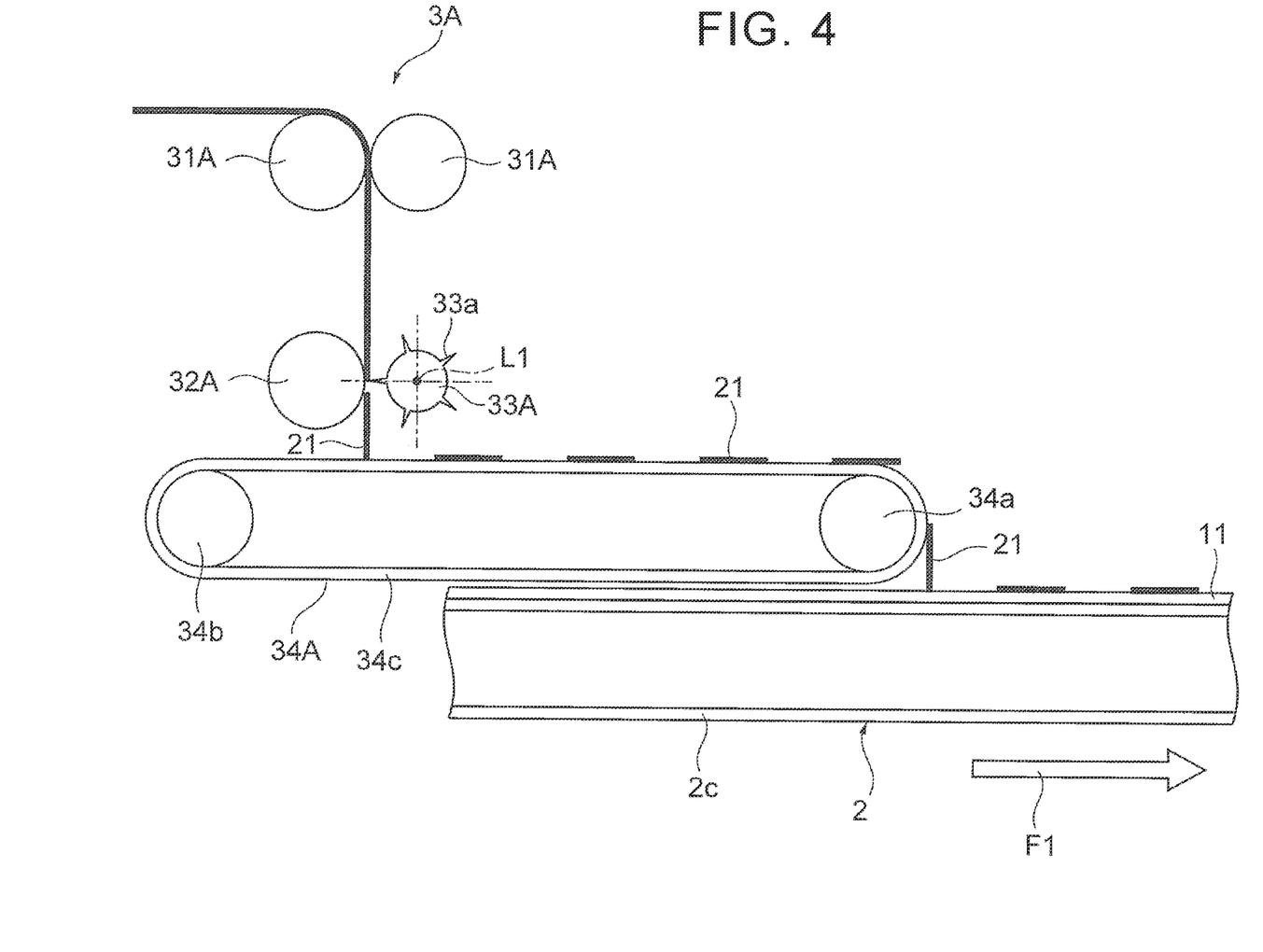
FIG. 4 is a schematic view showing the relationship of a cutter roller, conveyor, and a first conveyance unit as viewed in the vertical direction.

Further, in this embodiment, the level of the cutter roller 33A relative to the conveying surface of the conveyor 34A is set to be equal to the predetermined length of the fiber bundles 21 into which the long fiber bundles are cut with the cutter roller 33A, so that the fiber bundles 21 can be easily oriented in the intended direction. For example, as shown in FIG. 4, when the predetermined length of the cut fiber bundles 21 is 10 mm, the distance from the center of the axis L1 of the cutter roller 33A to the conveying surface of the conveyor 34A (namely, the upper surface of the conveyor 34A) is 10 mm. In this manner, the cut fiber bundles 21 can land on the conveying surface of the conveyor 34A without bouncing, and therefore, are likely to be oriented in the intended direction. In this connection, the level of the cutter roller 33A relative to the conveying surface of the conveyor 34A and the length of the cut fiber bundles 21 may be exactly equal to each other, or may be substantially equal to each other with an error that can be allowed in terms of manufacturing.

Similarly, the level of the conveyor 34A relative to the conveying surface of the first conveyance unit 2 is preferably set to be equal to the predetermined length of the cut fiber bundles 21. For example, as shown in FIG. 4, the distance from the center of the axis of the drive rotary wheel 34 of the conveyor 34A to the conveying surface of the first conveyance unit 2 (namely, the upper surface of the first conveyance unit 2), as measured in the vertical direction, is 10 mm. With this arrangement, the cut fiber bundles 21 can land on the lower carrier film 11 conveyed by the first conveyance unit 2 without bouncing, and are likely to be oriented in the intended direction.

While the second cutting unit 3B located downstream of the first cutting unit 3A has the same structure as the first cutting unit 3A, the orientations of the pullout roller 31B, guide roller 32B, cutter roller 33B, and the conveyor 34B are different from those of the first cutting unit 3A. In the following, the difference in connection with the cutter roller 33B, by way of example, will be described.

More specifically, when viewed from above the cutter rollers 33A, 33B, 33C, 33D, the cutter roller 33B of the second cutting unit 3B (namely, the second cutter roller along the conveying direction F1 of the first conveyance unit 2) is oriented such that the direction of its axis L2 forms an angle of +45° with the direction of the axis L1 of the cutter roller 33A (namely, the first cutter roller along the conveying direction F1 of the first conveyance unit 2). Namely, angle α1 (see FIG. 2) formed between the direction of the axis L2 of the cutter roller 33B and the direction of the axis L1 of the cutter roller 33A is +45°. In this embodiment, angle α1, α2, α3 formed between the direction of each axis of the second to fourth cutter rollers and the direction of the axis L1 of the cutter roller 33A will be denoted with "+" when measured in the counterclockwise direction from the direction of the axis L1 of the cutter roller 33A, and denoted with "−" when measured in the clockwise direction from the direction of the axis L1.

At this time, the cutter roller 33B is oriented such that the direction of its axis L2 forms an angle θ2 (θ2=112.5°) with the conveying direction F1 of the first conveyance unit 2. In the second cutting unit 3B, the width Y2 of the conveyor 34B is obtained according to a relational expression that Y2=X/sin θ2, and the conveying velocity v2 of the conveyor 34B is obtained according to a relational expression that v2=V×sin θ2, in the same manner as that with regard to the first cutting unit 3A.

Also, in the second cutting unit 3B, since the direction of the axis L2 of the cutter roller 33B forms the angle of +45° with the direction of the axis L1 of the cutter roller 33A, fiber bundles 22 cut with the cutter roller 33B and freely falling on the lower carrier film 11 via the conveyor 34B have an orientation angle of 45° relative to the fiber bundles 21 cut in the first cutting unit 3A and freely falling on the lower carrier film 11.

While the third cutting unit 3C located downstream of the second cutting unit 3B has the same structure as the first cutting unit 3A, the orientations of the pullout roller 31C, guide roller 32C, cutter roller 33C, and the conveyor 34C are different from those of the first cutting unit 3A. In the following, the difference in connection with the cutter roller 33C, by way of example, will be described More specifically, when viewed from above the cutter rollers 33A, 33B, 33C, 33D, the cutter roller 33C of the third cutting unit 3C (namely, the third cutter roller along the conveying direction F1 of the first conveyance unit 2) is oriented such that the direction of its axis L3 forms an angle of −45° with the direction of the axis L1 of the cutter roller 33A. Namely, angle α2 (see FIG. 2) formed between the direction of the axis L3 of the cutter roller 33C and the direction of the axis L1 of the cutter roller 33A is −45°.

At this time, the cutter roller 33C is oriented such that the direction of its axis L3 forms an angle θ3 (θ3=22.5°) with the conveying direction F1 of the first conveyance unit 2. In the third cutting unit 3C, the width Y3 of the conveyor 34C is obtained according to a relational expression that Y3=X/sin θ3, and the conveying velocity v3 of the conveyor 34C is obtained according to a relational expression that v3=V×sin θ3, in the same manner as that with regard to the first cutting unit 3A.

Also, in the third cutting unit 3C, since the direction of the axis L3 of the cutter roller 33C forms an angle of −45° with the axis L1 of the cutter roller 33A, fiber bundles 23 cut with the cutter roller 33C and freely falling on the lower carrier film 11 via the conveyor 34C have an orientation angle of −45° relative to the fiber bundles 21 cut in the first cutting unit 3A and freely falling on the lower carrier film 11.

While the fourth cutting unit 3D located downstream of the third cutting unit 3C has the same structure as the first cutting unit 3A, the orientations of the pullout roller 31D, guide roller 32D, cutter roller 33D, and the conveyor 34D are different from those of the first cutting unit 3A. In the following, the difference in connection with the cutter roller 33D, by way of example, will be described.

More specifically, when viewed from above the cutter rollers 33A, 33B, 33C, 33D, the cutter roller 33D of the fourth cutting unit 3D (namely, the fourth cutter roller along the conveying direction F1 of the first conveyance unit 2) is oriented such that the direction of its axis L4 forms an angle of +90° with the direction of the axis L1 of the cutter roller 33A. Namely, angle α3 (see FIG. 2) formed between the direction of the axis L4 of the cutter roller 33D and the direction of the axis L1 of the cutter roller 33A is +90°.

At this time, the cutter roller 33D is oriented such that the direction of its axis L4 forms an angle θ4 (θ4=157.5°) with the conveying direction F1 of the first conveyance unit 2. In the fourth cutting unit 3D, the width Y4 of the conveyor 34D is obtained according to a relational expression that Y4=X/sin θ4, and the conveying velocity v4 of the conveyor 34D is obtained according to a relational expression that v4=V× sin θ4, in the same manner as that with regard to the first cutting unit 3A.

Also, in the fourth cutting unit 3D, since the direction of the axis L4 of the cutter roller 33D forms an angle of +90° with the direction of the axis L1 of the cutter roller 33A, fiber bundles 24 cut with the cutter roller 33D and freely falling on the lower carrier film 11 via the conveyor 34D has an orientation angle of 90° relative to the fiber bundles 21 cut in the first cutting unit 3A and freely falling on the lower carrier film 11.

The second conveyance unit 4 is a belt conveyor in which an endless belt 4c is looped around a drive rotary wheel 4a and a driven rotary wheel 4b, for example, and continuously conveys the upper carrier film 12 rolled out from a film roll 14, in a conveying direction F2 (see arrow F2 in FIG. 1) opposite to the conveying direction F1 of the first conveyance unit 2. In a generally middle, upper part of the second conveyance unit 4, a doctor box 7 is provided for supplying paste containing thermosetting resin, to the upper carrier film 12 conveyed by the second conveyance unit 4.

The doctor box 7 is mounted so as to extend in the width direction of the second conveyance unit 4, over the upper carrier film 12 conveyed by the second conveyance unit 4. The doctor box 7 is used for applying paste by coating to the upper surface of the upper carrier film 12, via slits (not shown) formed in its bottom portion, to form a resin layer having a given thickness. Then, the upper carrier film 12 undergoes change of its direction downward at the terminal end of the second conveyance unit 4, so that its upper surface coated with the paste and the upper surface of the lower carrier film 11 coated with the paste are stuck together.

The impregnating unit 5 has a plurality of lower impregnation rollers 5a and a plurality of upper impregnation rollers 5b located behind the first conveyance unit 2, downstream of the fourth cutting unit 3D. The lower impregnation rollers 5a and the upper impregnation rollers 5b apply pressure to the lower carrier film 11 and the upper carrier film 12 stuck together, from the lower side and the upper side, respectively. The lower impregnation rollers 5a and the upper impregnation rollers 5b are placed in a staggered arrangement, along the conveying direction F1 of the first conveyance unit 2.

In the following, the method for manufacturing the fiber reinforced resin material, using the manufacturing apparatus 1, will be described. The method for manufacturing the fiber reinforced resin material mainly includes a coating step, a cutting step, and an impregnating step.

In the coating step, the lower carrier film 11 rolled out from the film roll 13 is coated with the paste having a given thickness, by means of the doctor box 6, while being conveyed by the first conveyance unit 2 in the conveying direction F1. In the meantime, the upper carrier film 12 rolled out from the film roll 14 is coated with the paste having a given thickness, by means of the doctor box 7, while being conveyed by the second conveyance unit 4 in the conveying direction F2.

In the cutting step following the coating step, the long fiber bundles are cut into a plurality of pieces having a predetermined length, with each cutter roller, and the cut fiber bundles are caused to freely fall on the conveying surface of each conveyor. Further, the cut fiber bundles are conveyed by each conveyor, to fall on the conveying surface of the first conveyance unit 2.

More specifically, in the first cutting unit 3A, the long fiber bundles are cut with the cutter roller 33A, at the time when leading ends of the long fiber bundles reach the conveying surface of the conveyor 34A. The cut fiber bundles 21 freely fall on the conveying surface of the conveyor 34A without bouncing, and are conveyed by the conveyor 34A toward the first conveyance unit 2. Then, at the terminal end of the conveyor 34A, the fiber bundles 21 freely fall onto the paste-coated upper surface of the lower carrier film 11 conveyed by the first conveyance unit 2, without bouncing.

In the second cutting unit 3B, the long fiber bundles are cut with the cutter roller 33B, at the time when leading ends of the long fiber bundles reach the conveying surface of the conveyor 34B. The cut fiber bundles 22 freely fall on the conveying surface of the conveyor 34B without bouncing, and are conveyed by the conveyor 34B toward the first conveyance unit 2. Then, at the terminal end of the conveyor 34B, the fiber bundles 22 freely fall onto the paste-coated upper surface of the lower carrier film 11 conveyed by the first conveyance unit 2, without bouncing. At this time, since the direction of the axis L2 of the cutter roller 33B forms an angle of +45° with the direction of the axis L1 of the cutter roller 33A, the fiber bundles 22 are laid on the fiber bundles 21 cut in the first cutting unit 3A, at an orientation angle of 45° relative to the fiber bundles 21.

In the third cutting unit 3C, the long fiber bundles are cut with the cutter roller 33C, at the time when leading ends of the long fiber bundles reach the conveying surface of the conveyor 34C. The cut fiber bundles 23 freely fall on the conveying surface of the conveyor 34C without bouncing, and are conveyed by the conveyor 34C toward the first conveyance unit 2. Then, at the terminal end of the conveyor 34C, the fiber bundles 23 freely fall onto the paste-coated upper surface of the lower carrier film 11 conveyed by the first conveyance unit 2, without bouncing. At this time, since the direction of the axis L3 of the cutter roller 33C forms an angle of −45° with the direction of the axis L1 of the cutter roller 33A, the fiber bundles 23 are laid on the fiber bundles 21 and the fiber bundles 22, at an orientation angle of −45° relative to the fiber bundles 21 cut in the first cutting unit 3A.

In the fourth cutting unit 3D, the long fiber bundles are cut with the cutter roller 33D, at the time when leading ends of the long fiber bundles reach the conveying surface of the conveyor 34D. The cut fiber bundles 24 freely fall on the conveying surface of the conveyor 34D without bouncing, and are conveyed by the conveyor 34D toward the first conveyance unit 2. Then, at the terminal end of the conveyor 34D, the fiber bundles 24 freely fall onto the paste-coated upper surface of the lower carrier film 11 conveyed by the first conveyance unit 2, without bouncing. At this time, since the direction of the axis L4 of the cutter roller 33D forms an angle of +90° with the direction of the axis L1 of the cutter roller 33A, the fiber bundles 24 are laid on the fiber bundles 21, fiber bundles 22, and the fiber bundles 23, at an orientation angle of 90° relative to the fiber bundles 21 cut in the first cutting unit 3A.

Thus, when the lower carrier film 11 successively passes the first cutting unit 3A, second cutting unit 3B, third cutting unit 3C, and the fourth cutting unit 3D, the fiber bundles 21, fiber bundles 22 having an orientation angle of 45° with respect to the fiber bundles 21, fiber bundles 23 having an orientation angle of −45°, and the fiber bundles 24 having an orientation angle of 90° are laid in this order on the upper surface of the lower carrier film 11. Then, the lower carrier film 11 on which the fiber bundles 21-24 are laid, and the upper carrier film 12, are stuck together at the terminal end of the first conveyance unit 2.

In the impregnating step following the cutting step, when the lower carrier film 11 and upper carrier film 12 stuck together pass the impregnating unit 5, the paste and the fiber bundles 21-24 sandwiched between the lower carrier film 11 and the upper carrier film 12 are pressurized by the lower impregnation rollers 5a and the upper impregnation rollers 5b. At this time, the fiber bundles 21-24 are impregnated with the paste with which the lower carrier film 11 and the upper carrier film 12 are coated. In this manner, the sheet-like fiber reinforced resin material (i.e., SMC) 10 is produced. The fiber reinforced resin material 10 thus produced may be rolled up onto a take-up roll 8, or may be received in a storage box (not shown) in a folded state.

In the apparatus 1 for manufacturing the fiber reinforced resin material according to this embodiment, the four cutter rollers (the cutter roller 33A of the first cutting unit 3A, cutter roller 33B of the second cutting unit 3B, cutter roller 33C of the third cutting unit 3C, and the cutter roller 33D of the fourth cutting unit 3D) are arranged such that their axial directions form different angles with the conveying direction F1 of the first conveyance unit 2. Therefore, the fiber bundles cut with these cutter rollers have different orientation angles. Then, the fiber bundles having different orientation angles are uniformly dispersed in the intended directions, so that the fiber orientation can be controlled.

In addition, the cutter roller 33B of the second cutting unit 3B, cutter roller 33C of the third cutting unit 3C, and the cutter roller 33D of the fourth cutting unit 3D are arranged such that the respective axial directions form angles of +45°, −45°, and +90° with the direction of the axis L1 of the cutter roller 33A of the first cutting unit 3A. Therefore, the fiber bundles 21-24 cut with these cutter rollers can be controlled so as to provide pseudo-isotropic orientation (0°, 45°, −45°, 90°). As a result, unevenness or a lack of uniformity in orientation is less likely or unlikely to appear, and the fiber reinforced resin material 10 having sufficient isotropic strength can be obtained.

Also, according to the method for manufacturing the fiber reinforce resin material according to this embodiment, the long fiber bundles are cut at the time when the leading ends of the long fiber bundles reach the conveying surface of each conveyor. Therefore, the cut fiber bundles in each cutting unit can be prevented from bouncing, and can be easily oriented in the intended direction. As a result, the fiber orientation can be controlled, and the lack of uniformity in orientation can be curbed.

While the embodiment of the disclosure has been described in detail, the disclosure is not limited to the above embodiment, but various design changes may be made without departing from the principle of the disclosure as stated in the appended claims. For example, while the four cutter rollers are provided in the above embodiment, the number of cutter rollers may be five or more. In this case, the second and subsequent cutter rollers may be arranged along the conveying direction F1 of the first conveyance unit 2, such that the respective axial directions form angles of +45°, −45°, +90°, 0°, +45°, −45°, . . . with the axial direction of the first cutter roller, for example.

While the use of the SMC is illustrated by way of example in the above embodiment, the disclosure may also be applied to manufacture of the fiber reinforced resin material by cutting long fiber bundles other than SMC, or tape-like members obtained by impregnating long fiber bundles with resin, into a plurality of pieces. For example, a fiber reinforced thermoplastic resin material may be produced by cutting fiber reinforced thermoplastic resin of one direction to cause the resin to fall freely, then heating the thermoplastic resin to a temperature equal to or higher than its fusing point, and further cooling the resin. In another method, a fiber reinforced thermoplastic resin material may be produced by cutting a plurality of long fiber bundles to cause the fiber bundles to fall freely, then applying thermoplastic resin power to the fiber bundles, heating the thermoplastic resin to a temperature equal to or higher than its fusing point, and further cooling the resin. In this case, the doctor boxes 6, 7 of the above manufacturing apparatus 1 may be eliminated.

Further, while the use of the cutter rollers is illustrated by way of example in the above embodiment, the disclosure may also be applied to the case where cutters other than the cutter rollers are used.

What is claimed is:

1. An apparatus for manufacturing a fiber reinforced resin material, by cutting fiber bundles into a plurality of pieces having a predetermined length, and impregnating the plurality of pieces with resin, the apparatus comprising:
   a plurality of cutters each having a predetermined length and configured to cut the fiber bundles, the plurality of cutters configured to cut corresponding fiber bundles independently;
   a belt conveyor provided below the plurality of cutters and configured to continuously convey the fiber bundles cut with the plurality of cutters,
   wherein the plurality of cutters are arranged along a conveying direction of the belt conveyor, such that respective longitudinal directions of the plurality of cutters form different angles with the conveying direction of the belt conveyor, when viewed from above the plurality of cutters; and
   a plurality of upper conveyors, wherein each of the plurality of upper conveyors is positioned directly below a plurality of blades of a corresponding one of the plurality of cutters and directly above the belt conveyor for conveying the plurality of pieces to the belt conveyor.

2. The apparatus according to claim 1, wherein the plurality of cutters comprises four or more cutters, and second and subsequent ones of the plurality of cutters are arranged along the conveying direction of the belt conveyor, such that the respective longitudinal direction of the second and subsequent ones of the plurality of cutters form angles of +45°, −45°, and +90° with the longitudinal direction of a first one of the plurality of cutters,
   wherein the angle with respect to the longitudinal direction of the plurality of cutters in the clockwise direction is denoted with "−" and the angle in the counterclockwise direction is denoted with "+".

3. The apparatus according to claim 1, wherein each of the plurality of cutters comprises a cutter roller on which the plurality of blades extending in the longitudinal direction of the each of the plurality of cutters is arranged in a radial fashion.

4. The apparatus according to claim 1, wherein each of the plurality of cutters comprises a pair of pullout rollers configured for pulling out the fiber bundles from a supply of fibers.

* * * * *